(12) United States Patent
Unitsky (10) Patent No.: US 12,479,667 B1
(45) Date of Patent: Nov. 25, 2025

(54) CARGO TRANSPORT COMPLEX

(71) Applicant: Anatoli Eduardovich Unitsky, Minsk Region (BY)

(72) Inventor: Anatoli Eduardovich Unitsky, Minsk Region (BY)

( * ) Notice: Subject to any disclaimer, the term of this patent is extended or adjusted under 35 U.S.C. 154(b) by 0 days.

(21) Appl. No.: 19/278,023

(22) Filed: Jul. 23, 2025

(30) Foreign Application Priority Data

Jul. 26, 2024 (EA) .................................. 202491936

(51) Int. Cl.
*B65G 15/08* (2006.01)
*B65G 21/08* (2006.01)
*B65G 21/20* (2006.01)
*B65G 23/16* (2006.01)

(52) U.S. Cl.
CPC ......... *B65G 15/08* (2013.01); *B65G 21/2054* (2013.01); *B65G 23/16* (2013.01); *B65G 21/08* (2013.01)

(58) Field of Classification Search
CPC .... B65G 15/08; B65G 23/16; B65G 21/2054; B65G 2201/04; B65G 21/08
USPC .................................................. 198/819, 821
See application file for complete search history.

(56) References Cited

U.S. PATENT DOCUMENTS

| 2,732,059 | A | * | 1/1956 | Erisman | ................. | B65G 15/46 |
| | | | | | | 198/833 |
| 5,031,753 | A | | 7/1991 | Tschantz | | |
| 5,088,920 | A | * | 2/1992 | Reunamaki | ........... | C03B 35/163 |
| | | | | | | 432/236 |

(Continued)

FOREIGN PATENT DOCUMENTS

| CN | 106586372 A | * 4/2017 | ............ B65G 69/02 |
| DE | 102019219482 A1 | 6/2021 | |

(Continued)

*Primary Examiner* — James R Bidwell (74) *Attorney, Agent, or Firm* — Harness, Dickey & Pierce, PLC (57) ABSTRACT

The apparatus is related to cargo transport systems, that use rail track structure as main transport for continuous hauling of lumpy and loose cargoes over distances of increased length. The claimed cargo transport complex of mounted type is installed on supports above ground (water) surface, and consists of two strands located one below the other or in one horizontal line—cargo strand and return strand. The strands are separated from each other on one side by a loading drum and a turning drum, on the other—by an unloading drum and a turning drum, which form loading-unloading devices, respectively. Both strands are fixed in load-bearing carcasses installed on each of the supports, equipped with drive mechanisms, contain track structure including rail cords, which are prestressed and tensioned with longitudinal tension force $F_R$, N, and may contain prestressed load-bearing elements, and bogies with support wheels resting thereon, positioned along the track structure with a pitch L, m, and a cargo-handling belt placed in the carcasses of the bogies, whereupon the cargo is distributed in the cargo strand, the latter is tensioned with longitudinal tension force $F_G$, N. Noteworthy that the bogies and the cargo-handling belt accommodated therein feature a grooved profile of depth H, m, and width S, m.

14 Claims, 5 Drawing Sheets

(56) References Cited

U.S. PATENT DOCUMENTS

| | | | |
|---|---|---|---|
| 5,526,922 A * | 6/1996 | Clark | B65G 17/126 198/708 |
| 6,481,566 B1 | 11/2002 | Horak | |
| 7,571,803 B2 | 8/2009 | Trieb | |
| 7,866,463 B2 | 1/2011 | Brunone | |
| 8,418,840 B2 | 4/2013 | Trieb | |
| 9,650,113 B2 | 5/2017 | Pletz | |
| 11,591,162 B2 | 2/2023 | Sansone | |
| 2016/0332822 A1* | 11/2016 | Brewka | B65G 23/44 |
| 2017/0341870 A1* | 11/2017 | Lurie | B65G 23/16 |

FOREIGN PATENT DOCUMENTS

| | | | | | |
|---|---|---|---|---|---|
| EP | 1452466 A1 | 9/2004 | | | |
| EP | 3395637 A1 | 10/2018 | | | |
| EP | 3805067 A1 | 5/2019 | | | |
| EP | 3560786 A1 | 10/2019 | | | |
| EP | 3907117 A1 | 12/2019 | | | |
| EP | 3604090 A1 | 2/2020 | | | |
| EP | 3617024 A1 | 3/2020 | | | |
| EP | 3702231 A1 | 9/2020 | | | |
| EP | 3882101 A1 * | 9/2021 | | | B65G 21/04 |
| EP | 3974278 A1 | 3/2022 | | | |
| EP | 3992049 A1 | 4/2022 | | | |
| EP | 4029754 A1 | 7/2022 | | | |
| EP | 4032775 A1 | 7/2022 | | | |
| EP | 4074570 A1 | 10/2022 | | | |
| WO | 2017219112 A1 | 12/2017 | | | |
| WO | 2017219113 A1 | 12/2017 | | | |
| WO | 2017219115 A1 | 12/2017 | | | |
| WO | 2017219116 A1 | 12/2017 | | | |
| WO | 2018170575 A1 | 9/2018 | | | |
| WO | 2018223208 A1 | 12/2018 | | | |
| WO | WO-2019079859 A1 * | 5/2019 | | | B65G 21/22 |
| WO | 2019241316 A1 | 12/2019 | | | |
| WO | 2020097713 A1 | 5/2020 | | | |
| WO | 2023209636 A1 | 11/2023 | | | |
| WO | 2024017644 A1 | 1/2024 | | | |

* cited by examiner

CARGO TRANSPORT COMPLEX

CROSS-REFERENCE TO RELATED APPLICATION

The present application claims priority to the Eurasian Patent Organization patent application No. 202491936, filed on Jul. 26, 2024, which is incorporated by reference herein.

BACKGROUND AND SUMMARY

The invention is related to cargo transport systems that use a rail track structure, and can be used as a main transport device for continuous hauling of lump and bulk cargo, in particular for moving rock from a mine or deposit over long distances. In this context, "rock" means all free (unbound) material to be removed from a mine (quarry) and includes both overburden and minerals (ore) and waste rock.

A rail conveyor system is known in Russian Patent No. 2600021, comprising a rail track, a plurality of trolleys located at a distance from each other, a flexible cable connecting said trolleys and providing tension and the ability to change the distance between the trolleys, and an endless carrier belt carried by the trolleys, wherein the trolleys are mounted with the ability to move on wheels supported by the rail track, and each of them has at least three wheels, of which two wheels or more wheels are located at a distance from each other in the direction of movement so that each trolley independently supports the rail track. The rail conveyor system according to the invention combines the main advantages of belt conveyors and railway systems. Such a rail conveyor system is a system for continuous transportation of bulk material, which, due to the use of steel wheels moving on steel rails, has a rolling resistance of the same magnitude as in railway systems, and at the same time has all the advantages of continuous delivery of cargo inherent in known belt conveyor systems. The disadvantages of this system include high material consumption and, accordingly, cost, as well as the possibility of using it over relatively short distances.

A cargo transport complex by Yunitski with a circular traffic is known in Eurasian U.S. Pat. No. 37,219, regarded as a prototype, containing a frame with a track structure, equipped with loading-unloading zones, as well as turn-around units, a body formed by a supporting belt part, equipped with reinforcing elements and uniformly distributed and secured along the length of the body by transverse axles equipped with wheels on both sides, and a drive mechanism connected to the body, wherein the track structure includes rail cords containing prestressed in the longitudinal direction load-bearing members of the rail cords and a body with a rolling surface for the wheels, and the supporting belt part of the body contains a longitudinally located load-bearing member of the body, prestressed by a longitudinal tension force, wherein the drive mechanism is made in interaction with traction devices located on the body, connected to the load-bearing member of the body, as well as support beams having a grooved profile of depth H, m, located with a pitch L, m, with justified ratios of the depth of the grooved profile, width S, m, of the supporting belt part and the pitch L, m, the location of the support beams. Hereby, the turn-around switches (nodes) are made with a certain radius R, m, the rail cords on the turn-around node are made with an inclined section that ensures the tilt of the body in the transverse direction at an angle $\gamma$, °, located within the range from 45 to 120°, and the unloading zone is located on the said inclined section of the turn-around node of the track structure.

The disadvantages of the prototype include the fact that the supporting belt part of the body is subject to significant longitudinal stresses, which lead to rapid wear thereof and reduces the overall length of the cargo route; in addition, the known cargo transport complex features an increased accommodation area due to the presence of turn-around switches in the horizontal plane.

The invention is based on the task of creating a mounted-type cargo transport complex with the possibility of its use over significant distances—about 1,000 km and more. The solution to the problem is aimed at achieving the following technical goals:

increasing the reliability and durability of the transport complex;

increasing the length of the cargo route with an increase in the transverse rigidity of the track structure between loading and unloading points;

ensuring an increase in the productivity of the transport complex.

The technical objectives in accordance with the task of the invention make it possible to create a cargo transport complex consisting of cargo and return strands secured in a load-bearing frame on supports, equipped with a drive mechanism, loading-unloading devices, and containing a track structure with prestressed and tensioned with a longitudinal tension force $F_R$, N, rail cords, bogies with support wheels resting thereon, distributed along the track structure with a pitch of L, m, and a cargo-handling belt (14) placed in the bogies, which is made tensioned with a longitudinal tension force $F_G$, N, wherein the bogies and the cargo-handling belt placed therein are made with a grooved profile with a depth of H, m, and a width of S, m, the differences whereof in accordance with the invention consist in the fact that traction belts rigidly connected to the bogies are made tensioned with a longitudinal tension force $F_T$, N, wherein the following ratio is achieved:

$$0.07 \leq (F_G + F_T)/F_0 \leq 0.7,$$

where $F_0$, N, —the smallest of the tension forces at break of the cargo-handling belt or the traction belt, the drive mechanism includes traction wheels interacting with the traction belts, moreover, the bogies are connected to each other by extended connecting elements placed along the track structure and tensioned with a longitudinal tension force $F_S$, N, satisfying the ratio:

$$0.05 \leq F_S/F_0 \leq 0.5,$$

loading-unloading devices are a loading drum and an unloading drum, additionally equipped with two turning drums—one at each loading and unloading point, with the loading drum and unloading drum carrying the cargo-handling belt, and the turning drums carrying the bogies, traction belts and extended connecting elements.

Hereby, the rail cords contain prestressed, longitudinally tensioned load-bearing elements, and the tension force of the rail cords $F_R$, N, is equal to the sum of the longitudinal tension forces of the load-bearing elements and the bodies of the rail cords, if any. The achievement of technical goals is facilitated by the fact that the track structure is connected to the supports by means of load-bearing crossbars.

The traction belts can be preferably secured along the outer edges of the bogies in which the cargo-handling belt is placed. In the operating state, the cargo is placed on the cargo-handling belt of the cargo strand. The loading-unloading devices can also be equipped with bypass rollers on an arcuate guide.

The achievement of the technical task is also ensured by the fact that the values of the ratios of the depth H, m, width S, m, of the grooved profile of the cargo-handling belt and pitch L, m, of location of the bogies (11) are determined by the dependencies:

$$0.5 \leq H/S \leq 1.5,$$
$$0.1 \leq S/L \leq 1.$$

A protective cover can be installed above the conveyor belt—a roof equipped with a seal. In the most preferred embodiments of the cargo transport complex, the cargo-handling belt is made of multiple layers. Hereby, at least one layer of the cargo-handling belt is provided with reinforcing elements.

The drive mechanism is made in the form of a load-bearing frame with a drive unit installed there. Hereby, the drive unit is equipped with a drive device connected to the traction wheels with the ability to regulate the drive force. Non-limiting embodiments of the claimed invention also possible, wherein the cargo strand has a larger quantity of load-bearing crossbars and/or load-bearing elements of the rail cord than the return strand. The achievement of the technical result is also facilitated by the fact that the track structure is configured with a 180° turn of the cargo-handling belt—in the section thereof at the loading point—in front of the loading drum, and in the section thereof at the off-loading point—after the unloading drum.

BRIEF DESCRIPTION OF THE DRAWINGS

The essence of the proposed invention is explained with the use of drawings (FIGS. 1-10), which depict the following.

DETAILED DESCRIPTION

Designations: 1—support; 2—cargo strand; 3—return strand; 4—track structure; 5—loading drum; 6—unloading drum; 7—turning drum; 7.1—bypass rollers; 8—carcass; 8.1—load-bearing crossbar; 9—rail cord; 10—load-bearing element; 11—bogie; 12—drive mechanism; 13—support wheel; 13.1—wheel pair; 14—cargo-handling belt; 14.1—cargo; 15—traction belt; 16—traction wheel; 17—connecting element; 18—roof; 19—seal; 20—180°—return mechanism; 21—axle.

Figure 1:
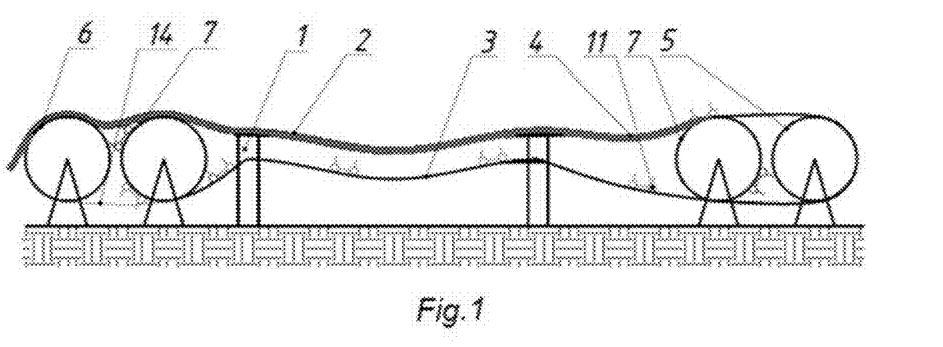
FIG. 1—schematic representation of a cargo transport complex.
Figure 2:
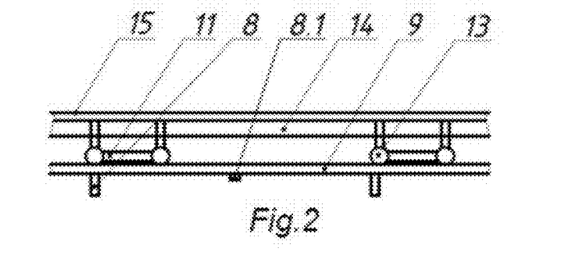
FIG. 2—longitudinal view of the track structure.
Figure 3:
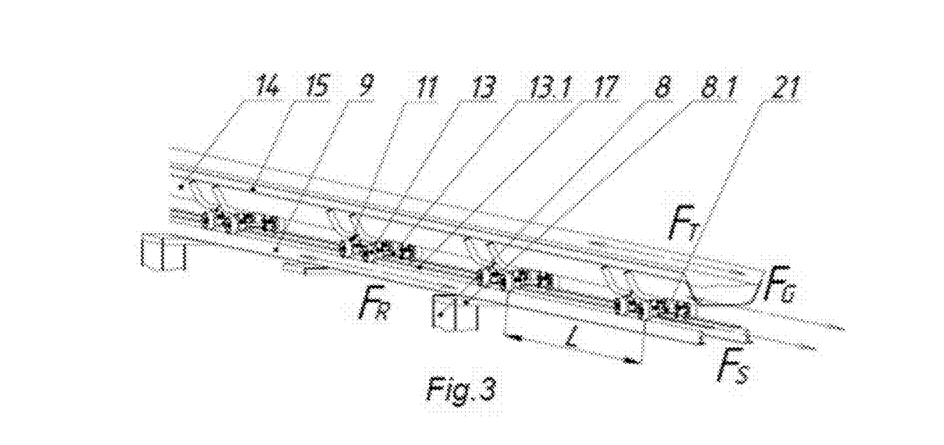
FIG. 3—fragment of the multidrawing of the track structure.

In more detail, the essence of the invention is as follows. The claimed cargo transport complex of the mounted type is installed on supports 1 above the earth's (water's) surface, consisting of two strands located one below the other (FIG. 1) or on the same horizontal (not shown in the drawings)—a cargo strand 2 and a return strand 3. The strands are separated from each other on one side by a loading drum 5 and a turning drum 7, on the other—by an unloading drum 6 and a turning drum 7, forming loading-unloading devices, respectively. Both strands are secured in supporting carcasses 8 installed on each of the supports, equipped with drive mechanisms 12, contain a track structure 4, including prestressed and tensioned with a longitudinal tension force $F_R$, N, rail cords 9, which may contain prestressed load-bearing elements 10 (FIG. 5), resting thereupon bogies 11 with support wheels 13 distributed along the track structure with a pitch of L, m, and cargo-handling belt 14 placed in the carcasses of the bogies 11, whereon a load 14.1 is distributed in the cargo strand 2, which is made tensioned with a longitudinal tension force $F_G$, N, wherein the bogies and the cargo-handling belt placed therein are made with a grooved profile with a depth of H, m, and a width of S, m, (FIG. 3, 4, 10).

The difference between the claimed invention and prior art analogues is as follows:

the cargo transport complex contains traction belts 15 rigidly connected to the bogie 11, tensioned with a longitudinal tension force $F_T$, N, whereby the following ratio is satisfied:

$$0.07 \leq (F_G + F_T)/F_0 \leq 0.7, \qquad (1)$$

where $F_0$, N—the smallest of the tension forces at break of the cargo-handling belt or the traction belt;

the drive mechanism 12 includes traction wheels 16 interacting with traction belts 15;

the bogies are connected to each other by extended connecting elements (17), placed along the track structure and tensioned with a longitudinal tension force $F_S$, N, satisfying the condition:

$$0.05 \leq F_S/F_0 \leq 0.5 \qquad (2)$$

loading-unloading devices include a loading drum 5 and an unloading drum 6, additionally equipped with two turning drums 7—one at each loading and unloading point, with the loading drum 5 and the unloading drum 6 accommodating the cargo-handling belt, and the turning drums 7 holding the bogies 11, traction belts 15 and extended connecting elements 17.

The specified values of the ratio (1) highlight the optimal range of longitudinal tension forces of the cargo-handling belt and the traction belts and make it possible to ensure without any particular difficulties the operational characteristics of the above-mentioned belts, providing for the formation of the optimal profile of the bogie 11 and its required process pressure on the rail cords 9 of the track structure 4. As a result, they ensure the estimated productivity and dynamics of unloading the cargo 14.1.

If the ratio (1) is less than 0.07, it is impossible to ensure the formation of a bogie of the required shape and rigidity, which leads to losses of the cargo 14.1 during its transportation; if the ratio (1) is more than 0.7, the cargo and traction belts will be in an overstressed state, will have virtually no margin of safety, which will lead to a decrease in the reliability and durability of the cargo transport complex. If the ratio (2) is less than 0.05, the connecting element will have an unacceptably low ability to hold the main parts of the cargo transport complex in a stationary state in the event of an emergency (for example, breakage of the traction and/or cargo-handling belts); if the ratio (2) is more than 0.5, the connecting element will have excessive tension, which will lead to a decrease in the reliability and durability of the cargo transport complex and to a possible breakage of the connecting element. Extended connecting elements 17 connect the bogie carcasses together, setting the distance therebetween. In the event of an emergency, they allow maintaining the integrity of the cargo transport complex.

The track structure 2 includes rail cords 9 containing longitudinally prestressed load-bearing elements 10 and a body (if any), as well as load-bearing crossbars 8.1, rigidly fixing the mutual transverse arrangement of the rail cords, with some of them, located on the supports, are rigidly connected to the carcass 8. At the same time, in various particular cases of embodying the cargo transport complex, the following distinguishing features can be realized in the track structures:

the track structure has a greater number of load-bearing crossbars and/or load-bearing elements of the rail cords in the cargo strand than in the return strand;

the track structure of both strands has an equal number of load-bearing crossbars and/or load-bearing elements of the rail cords;

the load-bearing crossbars are installed with variable periodicity in the longitudinal direction;

the load-bearing elements and the bodies of the rail cords are preferably in a prestressed state; wherein the tension force of the rail cords $F_R$, N, is equal to the sum of the longitudinal tension forces of the load-bearing elements and the bodies of the rail cords, if any;

the load-bearing elements in the rail cords of both or one of the strands may be absent;

the rail cords of both or one of the strands may be made bodyless;

the rail cords may be made monolithic, close in shape or identical to railway rails.

Figure 10:
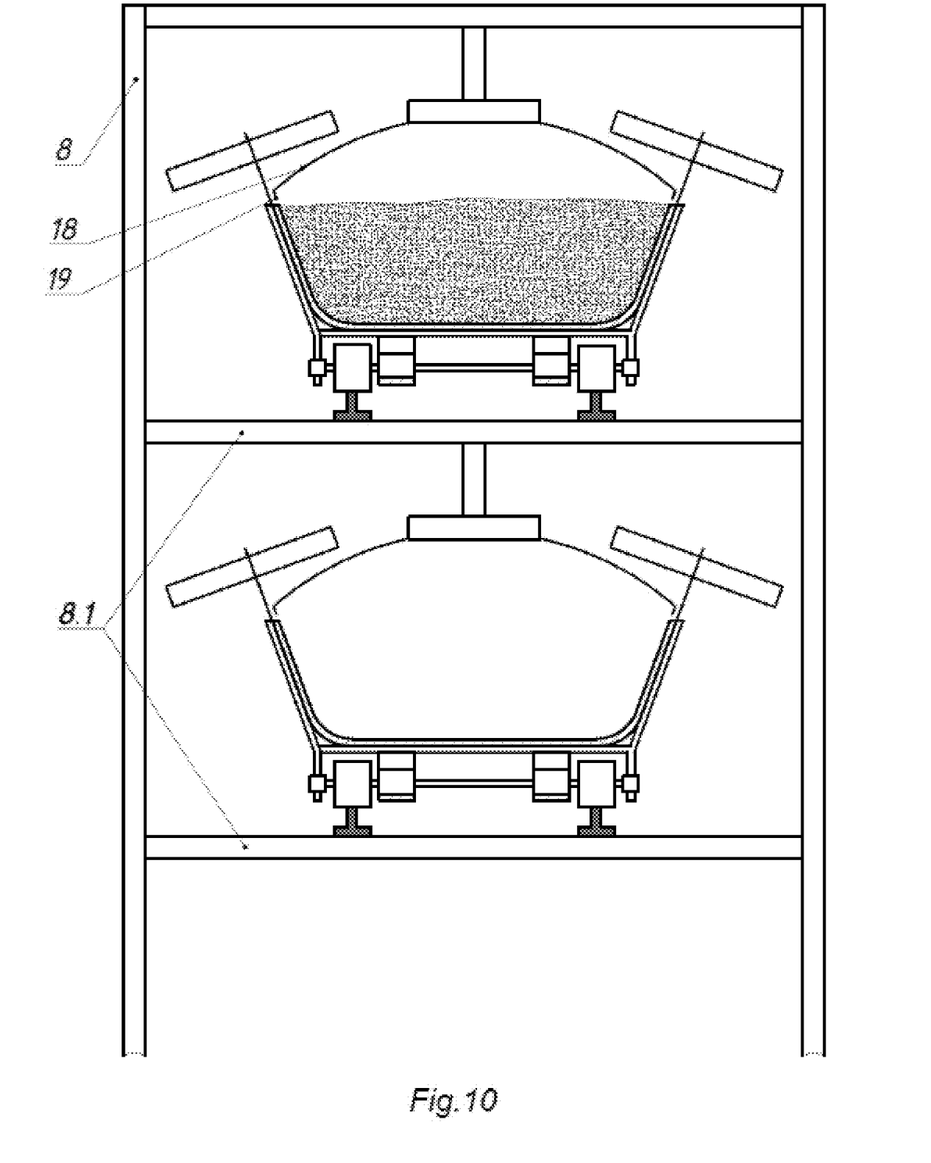
FIG. 10—cross-section of the track structure.

The use of the rail cords 9 in the form of prestressed longitudinally structure for the track structure 4 allows to provide for the straightness of the rail cords 9, increases the load-carrying capacity of the track structure 4, and, consequently, the productivity of the entire complex while reducing the overall material consumption with an increase in the transportation distance of cargo 14.1 from the point of its loading to the point of unloading. The track structure 4 is fastened to the supports 1 using carcass 8, a particular embodiment of which is shown in FIG. 10. The load-bearing crossbars 8.1 connect the rail cords 9 together and maintain their evenness on the supports and at distances therebetween.

Figure 4:
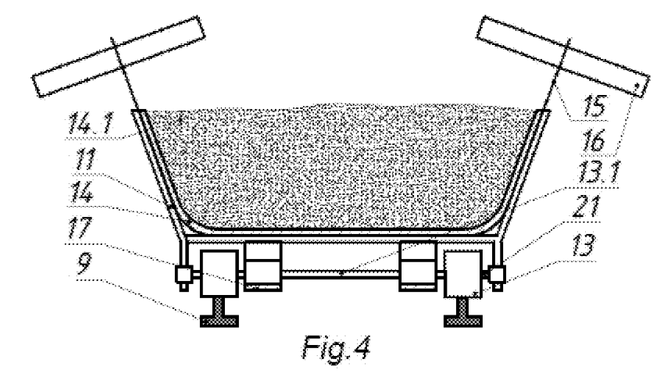
FIG. 4—fragment of the cross-section of the track structure.
Figure 5:
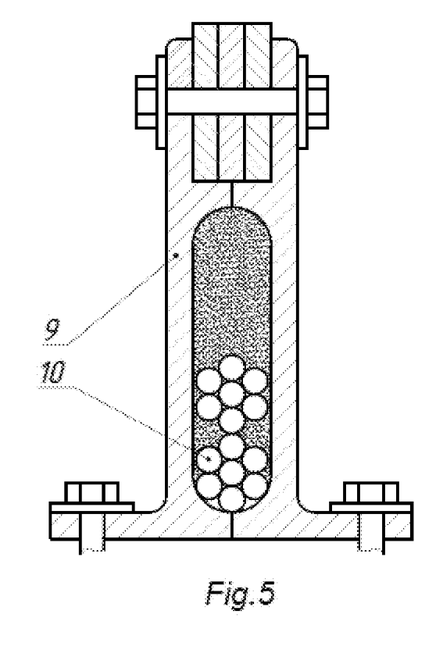
FIG. 5—cross-section of the rail cord.

The bogie 11 is formed preferably by the grooved bogie carcass, the cargo-handling belt 14 placed thereon, also acquiring the grooved profile, whereon the cargo 14.1 is placed in the cargo strand, support wheels 13 rigidly fixed thereto, extended connecting elements 17 and traction belts 15, fixed preferably longitudinally along the outer edges of the bogie (FIG. 4, 10). Alternatively, the traction belts can be fixed along the edges of the cargo-handling belt (FIG. 3). The support wheels 13 are preferably fixed on the axle 21 to form a pair of wheels 13.1. Fixing the traction belts on the two edges of the bogie carcass and applying traction force thereto makes it possible to release the cargo-handling belt from the direct traction action, which extends its service life and ultimately increases the reliability of the cargo transport complex. The formation of a pair of wheels 13.1, which rigidly connects pairs of support wheels, allows to increase the rigidity of the cargo transport complex as a whole and in particular to limit the swing of the bogies in the transverse direction, which reduces the loss of cargo in the cargo strand.

Figure 6:
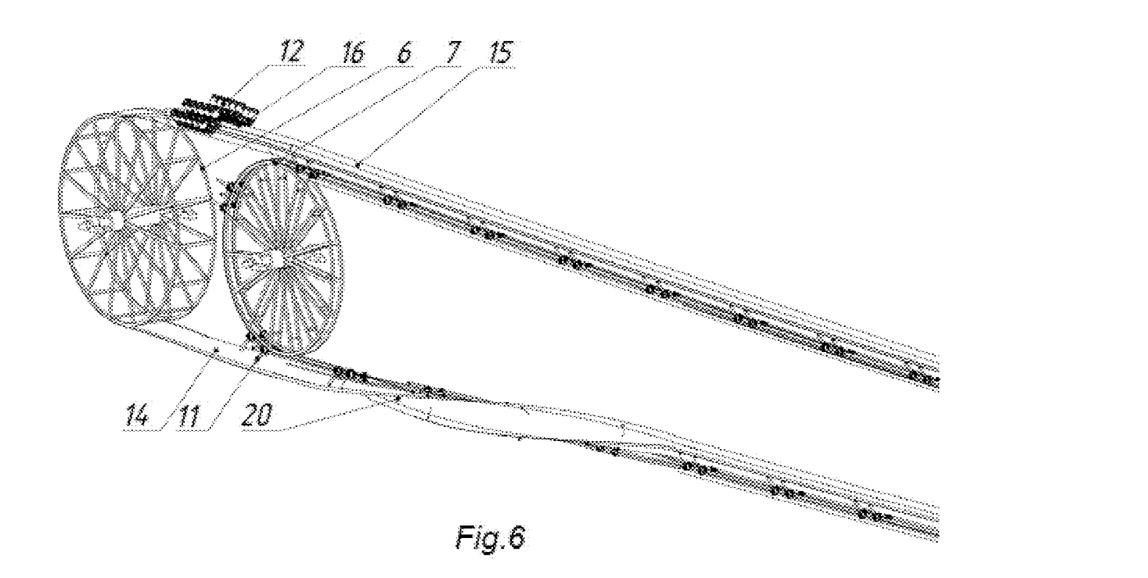
FIG. 6—cross-section of the unloading section of the mounted type cargo transport complex.
Figure 7:
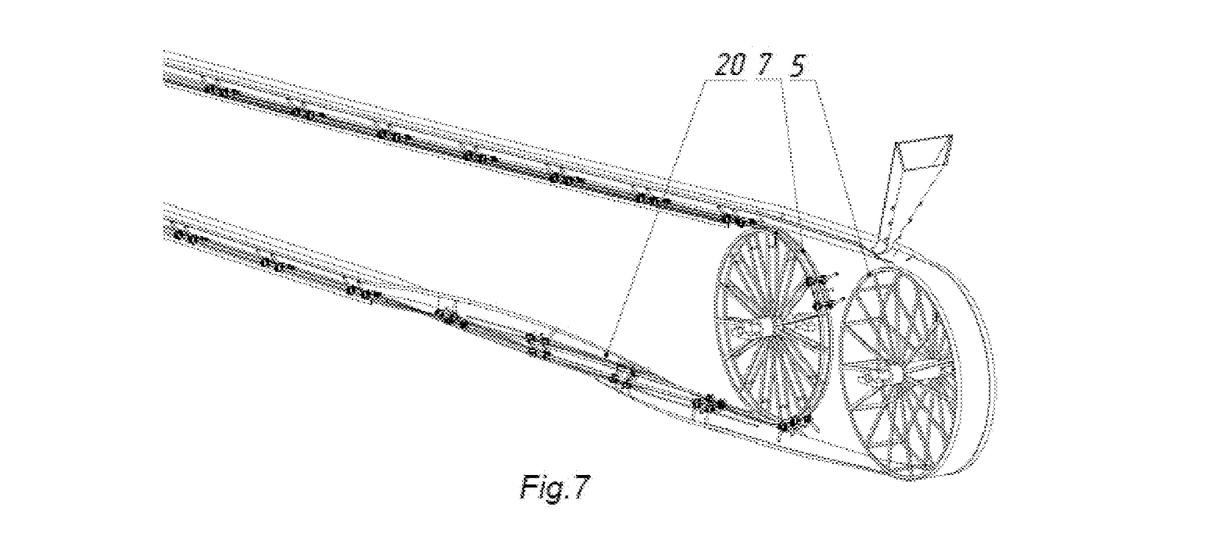
FIG. 7—longitudinal fragment of the loading section of the cargo transport complex.
Figure 8:
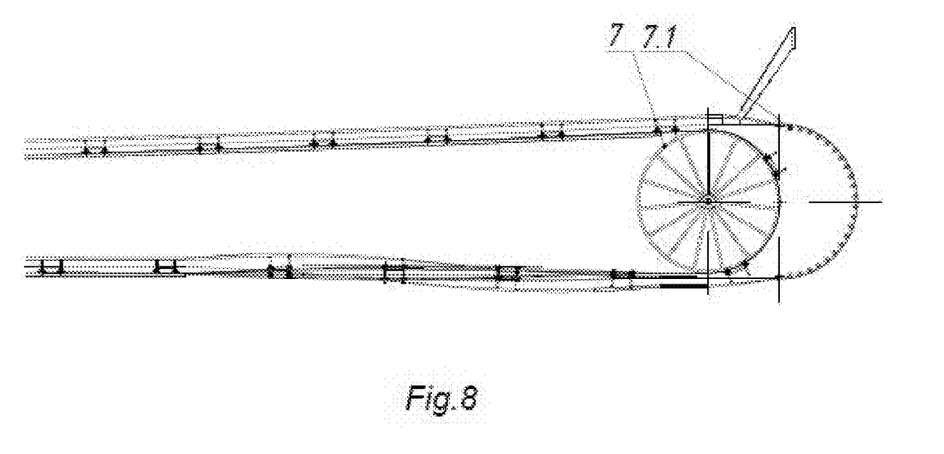
FIG. 8—longitudinal fragment of the loading section of the cargo transport complex with a turning drum and bypass rollers.
Figure 9:
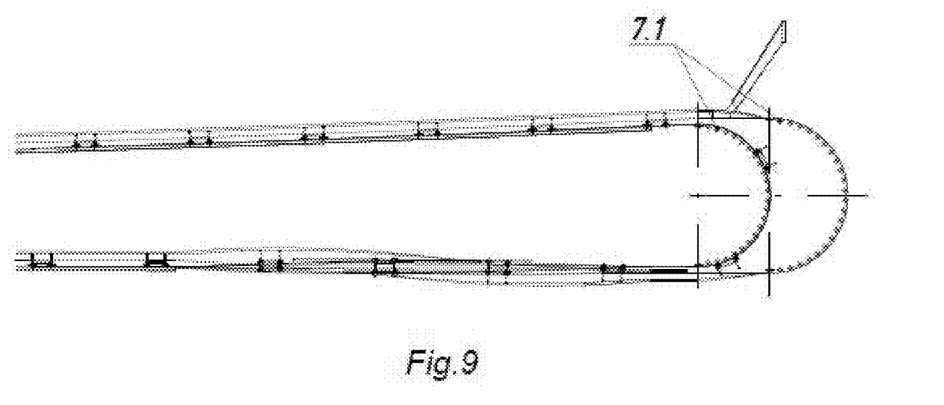
FIG. 9—longitudinal fragment of the loading section of the cargo transport complex with bypass rollers.

The loading-unloading devices are located at the loading point, at the unloading point and represent a loading drum 5 with a turning drum 7, an unloading drum 6 with a turning drum 7, respectively. The diameter of the turning drums 7 is determined based on the maximum bending forces applied to the traction belts and the dimensions of the bogie carcasses. Alternatively, instead of the drums 5, 6 of the loading-unloading devices and/or the turning drums 7, bypass rollers 7.1 can be used, located on the edges of the arcuate guides through which the cargo-handling belts (FIG. 8) and/or the traction belts with the bogie carcasses (FIG. 9) move. For a correct positioning, the loading belt performs a 180° turn in its part located at the loading point—in front of the loading drum, and in the part located at the unloading point—after the unloading drum. On the turning drums 8 (in the alternative version—the bypass rollers 7.1), the traction belts with the bogie carcasses and connecting elements are turned over by 180°, while the cargo-handling belt has a larger length relative to the traction belts and is pulled onto the drums 5, 6, which make it possible to separate in space the position of the turning drums 7 and the actual loading-unloading areas of the cargo, if necessary to carry out additional tensioning on the cargo-handling belt, and also to turn the cargo-handling belt over by 180° (FIG. 6-8). For correct arrangement in the strands, of the bogies with traction belts and connecting elements after passing loading-unloading devices, the bodies need to be turned over again by 180° with use of return mechanisms 20. These devices are located at the beginning of the return strand after the turning drum (FIG. 6) and at the end of the return strand in front of the turning drum (FIG. 7); the cargo-handling belt is also turned over thereon (FIG. 6-7). After a double turn by 180° and loading of cargo in the cargo strand, the cargo-handling belt is placed on the carcasses of bogies with traction belts; it is also placed in the return strand on the carcasses of bogies after unloading and a double turn by 180°. This makes it possible to create loading-unloading devices with optimal material consumption, to separate the turning of the carcasses of bogies with traction belts from the turning of the cargo-handling belts in order to reduce contamination of the carcasses of bogies, wheel pairs, traction belts; in addition, the preconditions are created for the possible movement of other cargo along the return strand.

To form the profile of the bogie 11, it is advisable that the carcass of the bogie (and, accordingly, the shape of the cargo-handling belt after laying on the bogie carcass) be made in a grooved form (FIG. 3, 4), while the values of the ratios of the depth H, m, width S, m, of the grooved profile of the cargo-handling belt and pitch L, m, of the location of the bogies are determined by the dependencies:

$$0.5 \leq H/S \leq 1.5, \qquad (3)$$

$$0.1 \leq S/L \leq 1 \qquad (4)$$

When making a grooved cargo-handling belt profile with a depth of H, m, of profile and width S, m, with the values corresponding to the ratio (3), it is possible to ensure the optimal shape of the bogie in the cross section.

If the ratio (3) is less than 0.5, then to ensure the estimated productivity of the cargo 14.1 transportation, a load-bearing belt of significant width S, m, as well as carcasses designed for a large load on the tension force, will be required, which will lead to an increase in the material intensity of the cargo transport complex. If the ratio (3) is more than 1.5, then a cargo-handling belt of increased width will also be required, which again will lead to an increase in the material intensity of the cargo transport complex.

The values of width S, m, of the cargo-handling belt 14 and the pitch L, m, of the arrangement of the bogies specified in the ratio (4) highlight the optimal range of these dimensions. If the ratio (4) is less than 0.1, the productivity of the transport complex will decrease and its material consumption will increase. If the ratio (4) is more than 1, the load on the cargo-handling belt will increase significantly, which will lead to a decrease in the reliability of the cargo transport complex.

The load-bearing cargo-handling belt 14 is preferably made of multiple layers. Furthermore, at least one of its layers is equipped with reinforcing elements. This allows to increase its reliability, strength and ensure its operational characteristics.

In order to increase the efficiency of the transport complex and reduce the impact of the environment on the transportation of cargo 14.1, it is advisable to secure a roof 18 with a seal 19 (FIG. 10) over the cargo-handling belt with cargo. Providing the roof with the seal 19 will also reduce cargo losses during transportation. In this case, the roof may be absent on certain sections of the track structure (for example, on the return strand).

In any of the non-limiting embodiments of the claimed cargo transport complex, preferably at least one drive mechanism 12 is installed on each strand, connected to the bogie 11 and the cargo-handling belt 14 by means of interaction with the traction wheels 16 installed in the form of a group on the track structure 4 and perceiving the drive force (FIG. 6). Increasing the number of drive mechanisms 12 installed on the cargo transport complex makes it possible to increase the productivity and range of transportation of cargo 14.1 to the required value. The drive mechanism 12, depending on the design solution, can be made by any methods selected from among the known ones, providing the transmission of the drive force to the traction wheels 16.

For example, the drive mechanism 12 can be made as a separate unit in the form of a unit secured to a load-bearing frame with a drive unit mounted thereon, connected to the engine (not shown in the figures). In turn, the drive unit is equipped with a drive device with traction wheels 16 mounted thereon with the ability to regulate the drive force applied thereto, which is transmitted to the traction belt 15. The drive of the drive mechanism 12 is provided by any of the known types of engines with the corresponding transmission and drive to the drive unit.

The claimed mounted-type cargo transport complex is realized as follows. In accordance with the design solution, supports 1 are erected, whereon carcasses 8 are installed, at the loading point—loading drum 5 and turning drum 7, at the unloading point—unloading drum 6 and turning drum 7. Then, on the supports, with use of carcasses 8, load-bearing crossbars 8.1 and on drums 5, 6, 7, the track structure 4 is formed, starting with the placement of rail cords 9. The rail cords are in a prestressed state in the longitudinal direction due to the presence of load-bearing elements 10; their transverse placement between the supports is fixed by the load-bearing crossbars 8.1. Such creation of rail cords ensures the required straightness, strength and rigidity of the track structure 4.

Then, the bogie carcasses are hung on the installed rail cords, placing the wheel pairs 13.1 on the rail cords. On the bogie carcasses, according to the shape of their profile, a cargo-handling belt 14 is placed, acquiring a grooved profile, stretched with a longitudinal tension force $F_G$, N, and then connected into a ring. After this, traction belts 15, which are in a taut state with a longitudinal tension force $F_T$, N, are fastened to the bogie carcasses on both sides in any suitable way, and then connected into a ring. Then, on both sides, connecting bogies are connected to each other to the formed bogies 11, and extended connecting elements 17, stretched with a tension force $F_S$, N, are attached. Traction wheels 16 are installed in groups on the traction belts, connected to the drive device of the drive unit of the drive mechanism 12. At least one drive mechanism is installed on each of the strands 2, 3.

The claimed mounted cargo transport complex operates as follows. Under the action of the drive mechanism 12, the drive force is transformed into rotation of the traction wheels, which sets in motion the traction belts and the cargo-handling belt with the bogies. At the loading point, the cargo-handling belt is uniformly loaded with cargo 14.1, as it moves, it is placed on the bogie carcasses from the turning drum and moves at a constant speed along the cargo strand to the unloading drum and the turning drum, where separation occurs: the bogie carcasses with traction belts and connecting elements move along the turning drum, where they are turned over by 180°, and the cargo-handling belt with cargo-along the unloading drum, where unloading occurs and then the cargo-handling belt turned over by 180° at the beginning of the return strand is reunited with the inverted bogie carcasses, traction belts and connecting elements. Then, on the 180°—return mechanism 20, the cargo-handling belt with the bogies and traction belts are turned over again by 180° and move at a constant speed along the return strand to the turning drum and the loading drum, in front of them, on a similar 180°—return mechanism, the cargo-handling belt with the bogie carcasses and connecting elements and traction belts are turned over and then the cargo-handling belt on the loading drum, and the bogie carcasses with traction belts and connecting elements-on the turning drum are turned over again, occupying the correct position in front of the loading point and then the cycle is repeated (FIGS. 1, 6-8).

While this application describes preferred embodiments of the structure design, it is clear that the claimed invention is not limited thereto and can be embodied using other known design elements within the scope of the specified set of essential features of the invention. The cargo transport complex of the described design allows to construct a high-tech cargo transport system with a rail track structure of a mounted, preferably string, type, with enhanced operational characteristics while reducing its cost and increasing productivity and durability.

The invention claimed is:
1. A cargo transport complex comprising:
cargo and return strands fixed in a load-bearing carcass on supports and equipped with drive mechanism, loading-unloading devices, and containing track structure, including prestressed and tensioned with longitudinal tension force $F_R$, N, rail cords, with resting thereupon bogies with support wheels, distributed along the track structure with a pitch L, m, and a cargo-handling belt placed in bogies, which is tensioned with a longitudinal tension force $F_G$, N, wherein the bogies and the cargo-handling belt accommodated therein have a grooved profile with a depth H, m, and a width S, m, wherein traction belts are rigidly connected with the bogies, and arranged tensioned with longitudinal tension force $F_T$, N, wherein the following ratio is attained:

$0.07 \leq (F_G+F_T)/F_0 \leq 0.7$, where $F_0$, N—the smaller of the tension forces at break of the cargo-handling belt or traction belt; and wherein the drive mechanism includes traction wheels interacting with traction belts, furthermore, the bogies are connected to each other by extended connecting elements placed along the track structure and tensioned with a longitudinal tension force $F_S$, N, satisfying the ratio:

$0.05 \leq F_S/F_0 \leq 0.5$, loading-unloading devices include a loading drum and an unloading drum, additionally equipped with two return drums—one at each loading and unloading point, with the cargo-handling belt placed on the loading drum and the unloading drum, and the bogies, traction belts and extended connecting elements placed on the return drums.

2. The cargo transport complex according to claim 1, wherein the cords contain prestressed, longitudinally tensioned load-bearing elements, wherein the tension force $F_R$, N of the rail cords is equal to the sum of the longitudinal tension forces of the load-bearing elements and the bodies of the rail cords, if any.

3. The cargo transport complex according to claim 1, wherein the track structure is connected to the supports by load-bearing crossbars.

4. The cargo transport complex according to claim 1, wherein the traction belts are secured along the outer edges of the bogies, wherein the cargo-handling belt is placed.

5. The cargo transport complex according to claim 1, wherein cargo is placed on the cargo-handling belt of the cargo strand.

6. The cargo transport complex according to claim 1, wherein loading drum or unloading drum, or either of the two return drums—at the loading and unloading points are represented by bypass rollers on an arcuate guide.

7. The cargo transport complex according to claim 1, wherein the values of the ratios of depth H, m, width S, m, the grooved profile of the cargo-handling belt and pitch L, m, location of the bogies are determined by the dependencies:

$0.5 \leq H/S \leq 1.5$, $0.1 \leq S/L \leq 1$.

8. The cargo transport complex according to claim 1, wherein a protective cover is installed above the cargo-handling belt–a roof, equipped with a seal.

9. The cargo transport complex according to claim 1, wherein the cargo-handling belt is made of multiple layers.

10. The cargo transport complex according to claim 1, wherein at least one layer of the cargo-handling belt is provided with reinforcing elements.

11. The cargo transport complex according to claim 1, wherein the drive mechanism is made in the form of a load-bearing frame with a drive unit installed thereon.

12. The cargo transport complex according to claim 1, wherein the drive unit is equipped with a drive device connected to the traction wheels with the ability to regulate the drive force.

13. The cargo transport complex according to claim 1, wherein the cargo strand has a larger quantity of load-bearing crossbars and/or load-bearing elements of the rail cord than the return strand.

14. The cargo transport complex according to claim 1, wherein the track structure is configured with a 180° turn of the cargo-handling belt—in the section thereof at the loading point—before the loading drum, and in the section thereof at the off-loading point—after the unloading drum.

* * * * *